(12) United States Patent
Smith et al.

(10) Patent No.: US 11,054,517 B2
(45) Date of Patent: Jul. 6, 2021

(54) MEASUREMENT SYSTEM AND METHODS OF MEASURING A REFLECTION COEFFICIENT

(71) Applicant: The Government of the United States of America, as represented by the Secretary of Homeland Security, Washington, DC (US)

(72) Inventors: Peter Roland Smith, Westfield, NJ (US); James Christopher Weatherall, Linwood, NJ (US); Jeffrey Brian Barber, Vineland, NJ (US); Barry Thomas Smith, Egg Harbor, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 16/929,751

(22) Filed: Jul. 15, 2020

(65) Prior Publication Data
US 2020/0348410 A1 Nov. 5, 2020

Related U.S. Application Data

(62) Division of application No. 15/949,715, filed on Apr. 10, 2018.
(Continued)

(51) Int. Cl.
*G01S 13/88* (2006.01)
*G01S 7/40* (2006.01)
(Continued)

(52) U.S. Cl.
CPC .............. *G01S 13/887* (2013.01); *G01S 7/40* (2013.01); *G01S 7/411* (2013.01); *G01S 13/88* (2013.01);
(Continued)

(58) Field of Classification Search
CPC .... G01S 13/887; G01S 13/88; G01S 13/0209; G01S 2007/027; G01S 2007/4086; G01S 7/40; G01S 7/411
(Continued)

(56) References Cited

U.S. PATENT DOCUMENTS 4,218,683 A * 8/1980 Hemming ............ H01Q 19/022
343/703
6,414,644 B1 * 7/2002 Desargant .............. H01Q 1/286
343/705
(Continued)

OTHER PUBLICATIONS

Dunsmore, Joel P. "Calibration and Vector Error Correction." Handbook of Microwave Component Measurements, John Wiley & Sons, 2012, pp. 124-210.
(Continued)

*Primary Examiner* — Erin F Heard
*Assistant Examiner* — Michael W Justice
(74) *Attorney, Agent, or Firm* — Lavanya Ratnam; Kelly G. Hyndman

(57) ABSTRACT

The present disclosure is directed to a measurement system for measuring a reflection coefficient of a test sample, including: a transceiver antenna configured to be coupled to a source of electromagnetic radiation; and a RAM positioned between the transceiver antenna and a measurement region of the transceiver antenna, wherein the RAM comprises an aperture substantially orthogonal to and substantially aligned with a transceiving axis of the transceiver antenna. A method for obtaining error correction of a measurement system and a method of measuring a reflection coefficient in a test sample are also provided.

10 Claims, 8 Drawing Sheets

Related U.S. Application Data

(60) Provisional application No. 62/483,681, filed on Apr. 10, 2017, provisional application No. 62/483,691, filed on Apr. 10, 2017.

(51) Int. Cl.
*G01S 7/41* (2006.01)
*G01S 13/02* (2006.01)
*G01S 7/02* (2006.01)

(52) U.S. Cl.
CPC ..... *G01S 13/0209* (2013.01); *G01S 2007/027* (2013.01)

(58) Field of Classification Search
USPC ..................................... 342/22, 165, 357.62
See application file for complete search history.

(56) References Cited

U.S. PATENT DOCUMENTS

| | | | | |
|---|---|---|---|---|
| 6,823,276 | B2* | 11/2004 | Blackham | G01R 35/005 |
| | | | | 702/85 |
| 9,157,954 | B2* | 10/2015 | Nickel | H01Q 1/243 |
| 9,860,054 | B1* | 1/2018 | Bradley | G01R 25/00 |
| 2008/0129625 | A1* | 6/2008 | Svensson | H01Q 21/205 |
| | | | | 343/767 |
| 2011/0181300 | A1* | 7/2011 | Bowring | G01S 13/08 |
| | | | | 324/637 |
| 2011/0304437 | A1* | 12/2011 | Beeler | H01Q 1/2216 |
| | | | | 340/10.1 |
| 2012/0306521 | A1* | 12/2012 | Nickel | H01L 21/00 |
| | | | | 324/754.03 |
| 2013/0015870 | A1* | 1/2013 | Nickel | G01R 31/2822 |
| | | | | 324/754.03 |
| 2015/0369756 | A1* | 12/2015 | Rezgui | G01N 22/00 |
| | | | | 702/57 |
| 2016/0209488 | A1 | 7/2016 | Zietz et al. | |

OTHER PUBLICATIONS

Hammler, J., Gallant, A. J., and Balocco, C., "Free-Space Permittivity Measurement at Terahertz Frequencies With a Vector Network Analyzer," IEEE Transactions on Terahertz Science and Technology, 6(6), 817-823 (2016).

Keysight, Specifying Calibration Standards and Kits for Keysight Vector Network Analyzers, Keysight Technologies Application Note AN 1287-11 (2014).

Smith, F., Chambers, B., and Bennett, J., "Calibration techniques for free space reflection coefficient measurements," IEE Proceedings A—Science, Measurement and Technology, 139(5), 247-253 (1992).

Weatherall, J. C., Barber, J., and Smith, B. T., "Identifying Explosives by dielectric properties obtained through wideband millimeter-wave illumination," Proc. SPIE, 9462, 94620F (2015).

Lamb, J. W., "Miscellaneous data on materials for millimetre and submillimetre optics," International Journal of Infrared and Millimeter Waves, 17(12), 1997-2034 (1996).

* cited by examiner

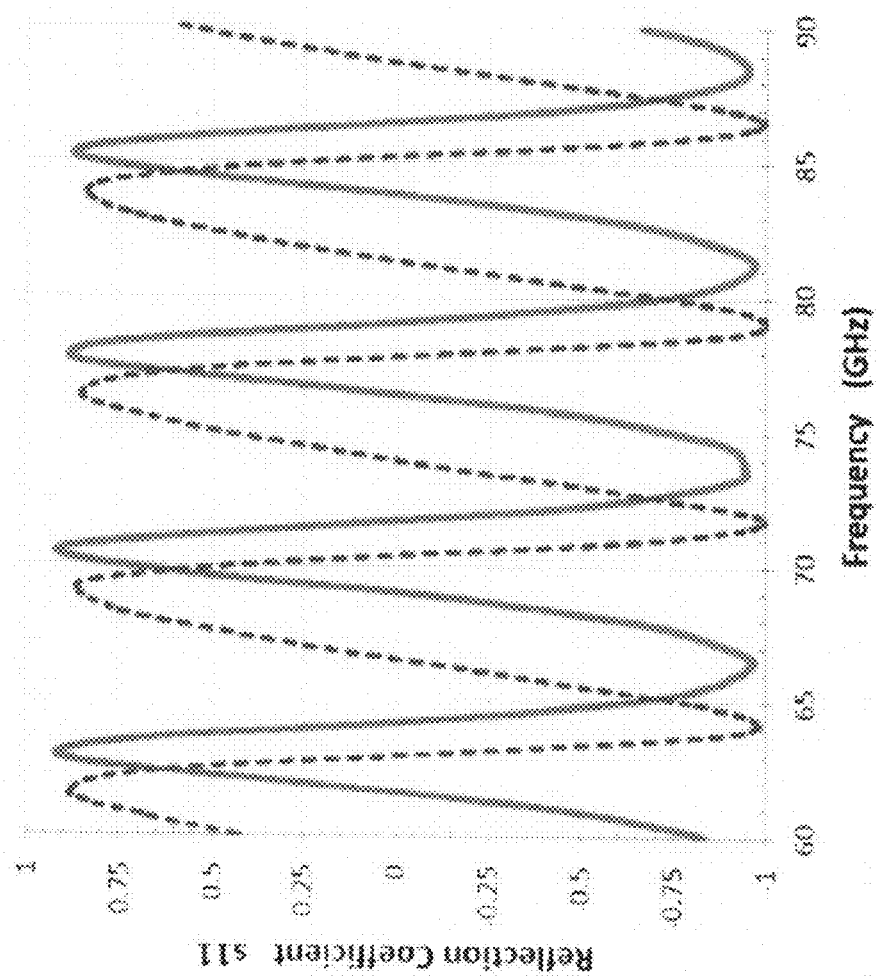

MEASUREMENT SYSTEM AND METHODS OF MEASURING A REFLECTION COEFFICIENT

CROSS-REFERENCE TO RELATED APPLICATIONS

This application is a divisional of U.S. patent application Ser. No. 15/949,715, filed 10 Apr. 2018, which claims the benefit of priority to U.S. Provisional Application No. 62/483,681, filed 10 Apr. 2017, and U.S. Provisional Application No. 62/483,691, filed 10 Apr. 2017; each of which is herein incorporated by reference its entirety.

GOVERNMENT RIGHTS

This invention was made with government support under HSHQDC-13-A-00023, Task Order No. HSHQDC-13-J-00444 awarded by the U.S. Department of Homeland Security. The United States Government has certain rights in this invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Imaging systems, such as commercial millimeter wave imaging systems, are used in security and other systems to detect substances, such as contraband. These imaging systems rely on the identification of anomalies in the images produced by the radiation reflected from a body of an inspected subject, for example. The reflection data may be used to determine a dielectric constant (relative permittivity), which is associated with a particular substance such as narcotics, agricultural products and explosives. Hence, accurate measurements of reflection data are useful, e.g., for correctly discriminating between an explosive and a harmless substance, detecting concealed weapons or identifying other materials of interest.

SUMMARY

The present inventors have developed a free space reflection measurement system, which provides highly accurate reflection data. This measurement system may be used for measuring the permittivity of materials using free space radiation over a large range of frequencies, including those above the V band. Methods for correcting non-idealities in measurement systems are also provided. The present measurement system and methods may be used to improve the accuracy of reflection coefficient measurements, e.g., by utilizing a test sample in combination with each calibration standard employed in order to locate the measurement reference plane more precisely at the surface of the sample. The present measurement system and methods also use a Radar Absorbing Material (RAM) with a RAM aperture, which can reduce lateral movement sensitivity of a sample, reduce reflections from the surrounding environment, and, consequently, improve measurement dynamic range.

In one aspect, the present disclosure is directed to a measurement system for measuring a reflection coefficient of a test sample, including: a transceiver antenna configured to be coupled to a source of electromagnetic radiation; and a RAM positioned between the transceiver antenna and a measurement region of the transceiver antenna, wherein the RAM comprises an aperture substantially orthogonal to and substantially aligned with a transceiving axis of the transceiver antenna.

The present disclosure is also directed to a method of measuring a reflection coefficient of a test sample, which method includes: positioning a test sample and a conducting material in a measurement region, wherein the test sample is positioned on a surface of the conducting material, and wherein the measurement region is located, for example, in the far-field of a transceiver antenna, the transceiver antenna being connected to a source of electromagnetic radiation; arranging a RAM between the transceiver antenna and the measurement region, wherein the RAM includes an aperture positioned substantially orthogonal to and substantially aligned with a transceiving axis of the transceiver antenna; illuminating the test sample with electromagnetic radiation over a predetermined frequency range, wherein the electromagnetic energy is transmitted from the transceiver antenna through the aperture in the RAM, and wherein reflected electromagnetic radiation from the test sample returns to the transceiver antenna via the aperture; and determining the reflection coefficient of the test sample based on the reflected electromagnetic radiation.

Also provided herein is a method of obtaining error correction for a reflection coefficient measurement system, which method includes: a) positioning a stack comprising a first calibration standard and a test sample in a measurement region of a reflection coefficient measurement system, the reflection coefficient measurement system including a transceiver antenna connected to a source of electromagnetic radiation, wherein the stack comprises a planar calibration surface and a planar test sample surface between which a height is defined, the planar calibration surface and the planar test sample surface being substantially parallel to each other and on opposing sides of the stack; b) illuminating at least a portion of the planar calibration surface at a reference plane with electromagnetic radiation over a predetermined frequency range, wherein the reference plane is substantially perpendicular to and positioned at the height of the stack; c) measuring a calibration reflection coefficient of the first calibration standard; d) determining a correction value for the first calibration standard from the measured reflection coefficient of the first calibration standard and a known calibration standard reflection coefficient; e) optionally repeating steps a) through d) with one or more additional calibration standard(s), wherein each of the one or more additional calibration standard(s) is stacked with the test sample, and wherein the one or more additional calibration standard(s) are different from each other and different from the first calibration standard; f) determining the error correction from the correction value(s) obtained in step d).

BRIEF DESCRIPTION OF THE DRAWINGS

An appreciation of the disclosure and many of the attendant advantages thereof may be understood by reference to the accompanying drawings. Included in the drawings are the following figures.

FIG. 8 depicts a graph showing the complex reflection coefficient $S_{11}$ over frequencies in the E band for P1000, 0.53 cm thick as described in the Examples. Real part solid line, imaginary part, dashed line.

DETAILED DESCRIPTION

Measurement System

The present disclosure is directed to a measurement system for measuring a reflection coefficient of a test sample. The measurement system includes a transceiver antenna configured to be coupled to a source of electromagnetic radiation and a RAM positioned between the transceiver antenna and a measurement region. The RAM comprises an aperture substantially orthogonal to and substantially aligned with a transceiving axis of the transceiver antenna.

Figure 1:
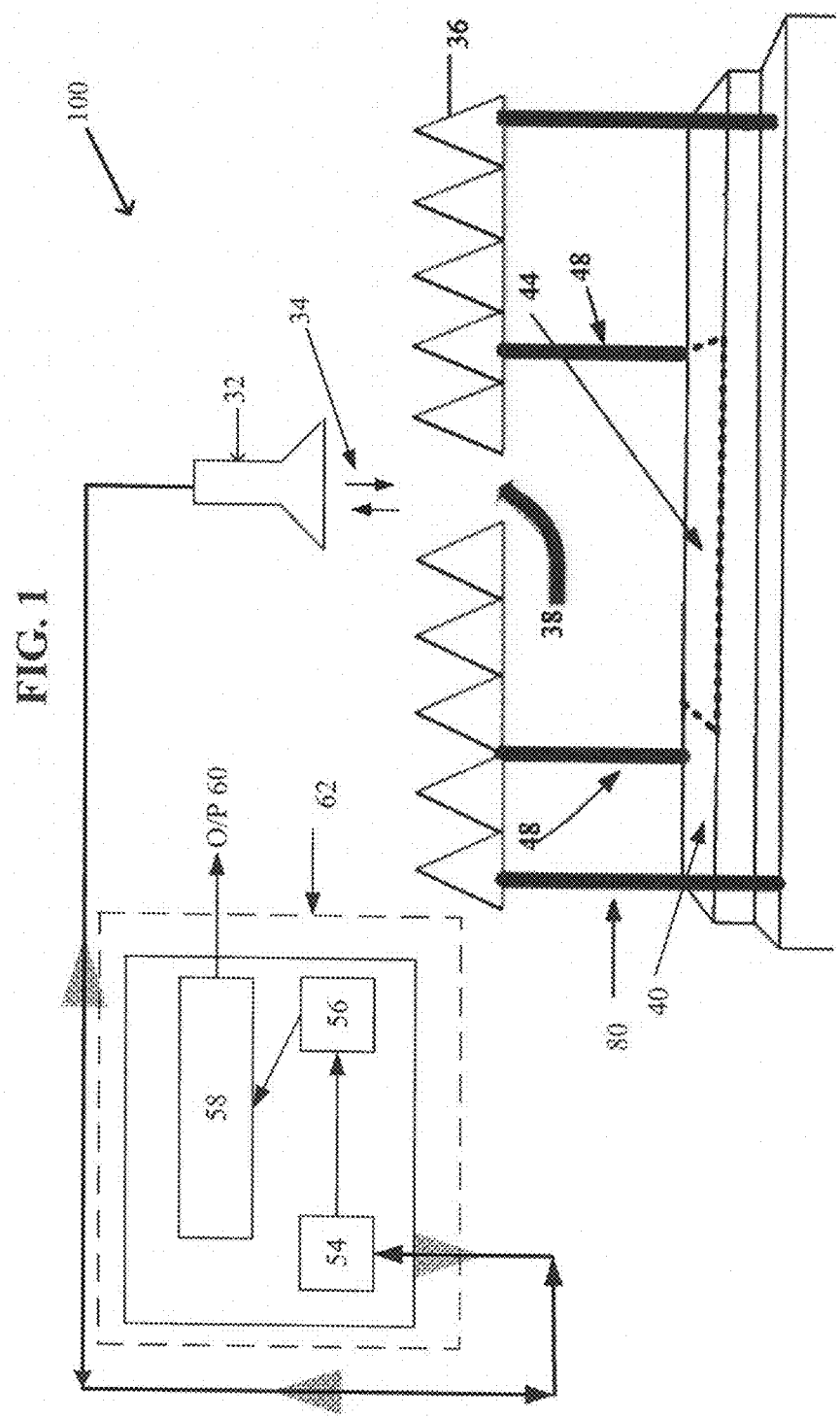
FIG. 1 depicts an embodiment of the present measurement system as described in the Detailed Description.

Referring now to the drawings wherein like reference numerals identify corresponding or similar elements throughout the several views, FIG. 1 depicts a measurement system 100 comprising a transceiving antenna 32 with a transceiving axis 34, a source of electromagnetic radiation 54, a receiver 56, a processor 58 providing output 60 and a staging area 80. Staging area 80 includes a measurement region 44, a stage 40, and posts 48 supporting the RAM 36 with an aperture 38. The source of electromagnetic radiation 54, the receiver 56, and the processor 58 may be combined into a vector network analyzer 62.

The transceiving antenna 32 is a combined transmitter and receiver antenna (transceiver antenna) configured to transmit and receive electromagnetic radiation along a transceiving axis 34. The transceiving antenna 32 is typically mounted (not shown) such that the transceiving axis thereof 34 is substantially orthogonal to and substantially aligned with a test sample (not shown) to be measured within a measurement region 44. Transceiving antennas suitable for use with the present measurement systems include e.g., a ridged antenna, a conical horn etc., such as a Model RCH012R, Custom Microwave, Inc., Longmont, Colo.

As further shown in FIG. 1, radar absorbing material (RAM) 36, such as a Model TDK IS-005A RAM, TDK RF Solutions, Inc., Cedar Parker, Tex., is positioned between the transceiver antenna 32 and the measurement region 44 of the transceiver antenna. The RAM 36, which comprises an aperture 38, may be supported by posts 48 set upright in a stage 40, such as a vertical translation stage, e.g., Model MLJ 050 from Thorlabs, Inc., Newton, N.J. The aperture 38 of the RAM 36 is arranged such that it is substantially orthogonal to and substantially aligned with the transceiving axis 34.

Aperture 38, may be of any shape and/or size, such as a geometric shape, e.g., a circle, triangle, rectangle, square etc. In some embodiments, the aperture is a square, each side of the square aperture having a length ranging from five to 10 wavelengths. In some embodiments, the aperture has an area ranging from 25 mm² to 10,000 mm², such as 2500 mm² to 5000 mm², such as 250 to 500, such as 25 mm² to 100 mm².

The measurement region 44 may be located in the radiating near field (Fresnel Field) or the far-field (Fraunhofer Field) of the transceiver 32. As used herein, a field, which is located very near to a transceiver is termed the "reactive near field." Radiation is not predominant in this field. In contrast, radiation predominates in the region next to the reactive near field, i.e., the "radiating near field" or "Fresnel field." In the Fresnel field, the angular field distribution depends on the physical distance from the transceiver. The far-field, or Fraunhofer region, which is dominated by radiated fields, is located next to the Fresnel field. In this region, the radiation pattern does not change shape with distance from the antenna.

In some embodiments, the far-field may be defined as:

Far-field≥$2D^2/\lambda$ where D is the largest dimension of the radiator (or the diameter of the transceiver) and λ is the wavelength of the electromagnetic wave, i.e., λ is the speed of light/signal frequency.

Typically, the measurement region 44 is located in the far-field of the transceiver antenna 32. In some embodiments, the location of the measurement region 44 relative to the transceiver antenna 32 may be described in terms of numerical ranges: for example, the distance of the measurement region from the transceiver antenna may be in the range of 0.1-1.2 meters or in the range of 0.12 to 0.3 meters, such as 0.16 to 0.24 meters. The skilled person would understand that such range is typically measured from the emitting/receiving aperture of the transceiver antenna 32, e.g. from the position at which free-space propagation of the electromagnetic radiation occurs.

Transceiving antenna 32 is configured to be coupled to a source of electromagnetic radiation 54 and a receiver 56 adapted to receive and measure electromagnetic radiation reflected from a test sample (not shown). The electromagnetic radiation source 54 may be provided by a signal generator, e.g., a radio frequency (RF) signal generator, a microwave signal generator, a microwave signal generator coupled with an external waveguide source module, etc.

In some embodiments, the electromagnetic radiation has a frequency in the range of 1-1000 GHz, such as 60 GHz to 500 GHz. For example, in some embodiments, the electromagnetic radiation has a frequency range in the V band (50 to 75 GHz, wavelength range 4.0 to 6.0 millimeters (mm)) or greater, e.g., the E band (60 to 90 GHz, wavelength range 5.0-3.33 mm), W band (75 to 110 GHz, wavelength range 2.7 mm to 4.0 mm), F band (90 to 140 GHz, wavelength range 2.1-3.3 mm), D band (110 GHz to 170 GHz, 1.8-2.7 mm), etc. Typically, the electromagnetic radiation has a frequency in the E band.

Receiver 56 is adapted to receive and to measure electromagnetic radiation reflected from the test sample (not shown) via the transceiver antenna 32. In some embodiments, the measurement output from the receiver 56 is input to a processor 58, which is configured to determine, e.g., a reflection coefficient, a permittivity and/or other parameters of a test sample (not shown). The processor 58 has an output 60 for providing, e.g., a determination of a reflection coefficient and/or a permittivity of a test sample (not shown). Typically, the electromagnetic radiation source 54, the receiver 56 and the processor 58 are combined within a network analyzer, such as a Performance Network Analyzer (PNA) or a Vector Network Analyzer (VNA) 62, for example, Model E8364C Vector Network Analyzer, Keysight Technologies Inc., Santa Rosa, Calif.

Figure 2:
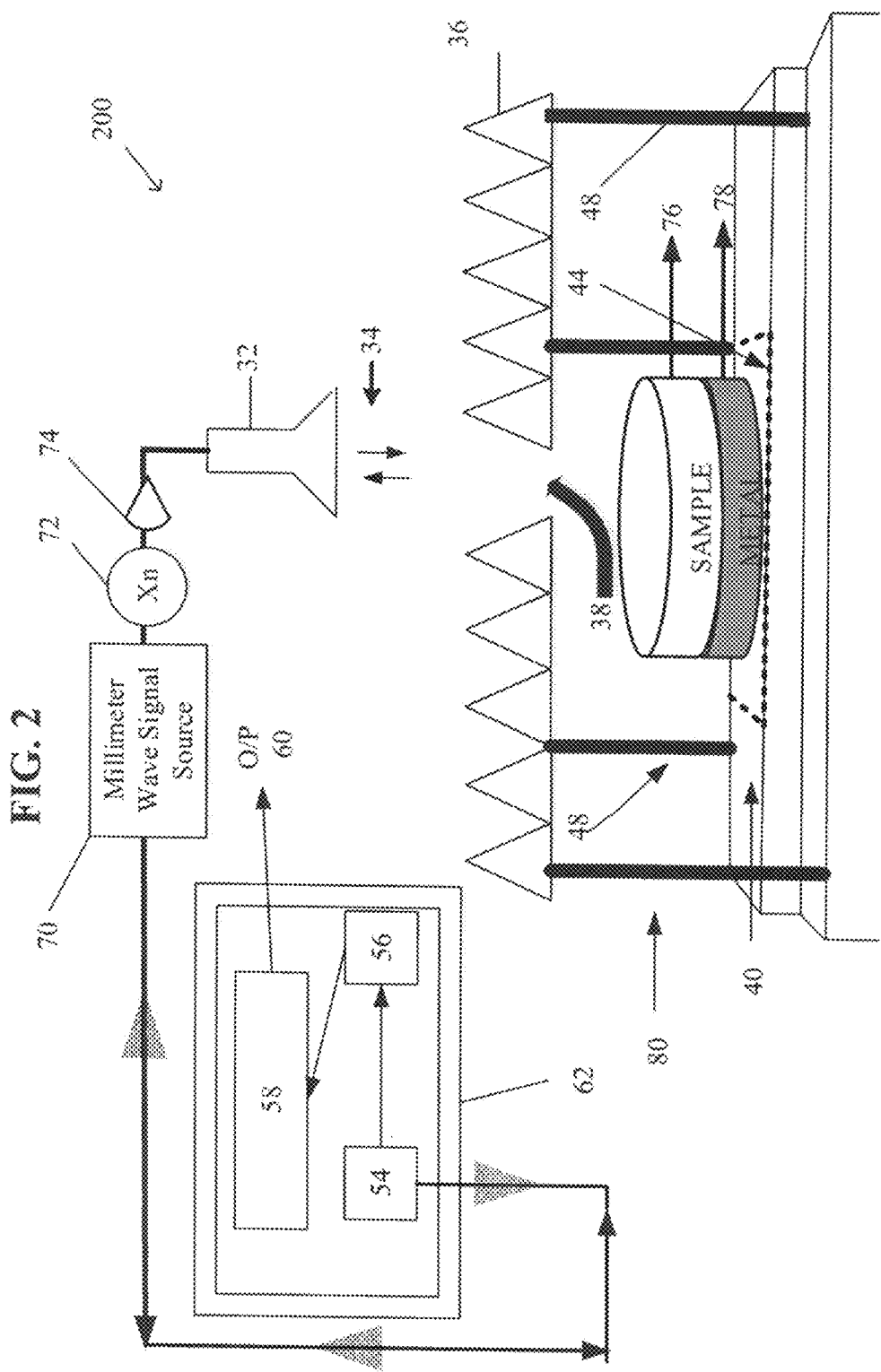
FIG. 2 depicts an embodiment of the present measurement system as described in the Detailed Description and the Examples.

An alternative measurement system 200 is shown in FIG. 2. In common with the embodiment of FIG. 1, measurement system 200 includes the transceiving antenna 32 with the transceiving axis 34, the source of electromagnetic radiation 54, the receiver 56, the processor 58 providing output 60 and the staging area 80. Staging area 80 includes the measurement region 44, the stage 40, and posts 48 supporting the RAM 36 with the aperture 38. In this measurement system 200, the source of electromagnetic radiation 54, the receiver 56, and the processor 58 is combined into VNA 62.

In contrast to the FIG. 1 example however, the electromagnetic source 54 of the measurement system 200, which is part of the VNA 62, is also depicted as connected to a millimeter wave signal source 70, such as a Model V12VNA2-T/R Millimeter Wave VNA Extender, OML, Inc., Morgan Hill, Calif. and a frequency multiplier 72. Optionally, the electromagnetic source may further comprise an amplifier 74. Millimeter wave VNA extenders, frequency multipliers and optional amplifiers may be desirable for the generation of frequencies in, e.g., the E band or greater.

Also in contrast to FIG. 1, the measurement system 200 of FIG. 2 depicts a test sample 76 in measurement region 44. In this embodiment, test sample 76 is placed on a conducting substrate 78, such as a metal conducting substrate, and the test sample/conducting substrate combination is placed into the measurement region 44 located on stage 40. A radiated beam passes through the aperture 38 in the RAM 36 to the test sample 76 being measured. The reflected signal passes back through the aperture 38 to the transceiver antenna 32, where it is collected and passed back to the e.g., a vector network analyzer 62 for reflection coefficient measurement.

Methods

Method of Measuring a Reflection Coefficient

The present disclosure is also directed to a method of measuring a reflection coefficient of a test sample. A reflection coefficient is a measure of a wave reflected back from a surface normalized to an incident wave, which may be used to describe, e.g., an overall property of a geometry and material composition of a test sample. More particularly, as used herein, the term "reflection coefficient" refers to a frequency dependent magnitude and phase (complex) reflection coefficient, e.g., $S_{11}$.

In some embodiments, the present method of measuring a reflection coefficient of a test sample 76 includes positioning the test sample 76 in a measurement region 44. As used herein, the term "test sample" refers to any item for which a reflection coefficient measurement and/or the determination of a dielectric property, such as complex permittivity, is desired. Accordingly, a test sample 76 is not limited to any particular item and may be of any size, shape, height or thickness. Examples of test samples include explosive simulants, e.g., in the form of a square 30 centimeters per each side and a thickness of 5 millimeters, explosives, agricultural products, narcotics, liquids, powders, etc. In some embodiments, the test sample may encompass a calibration standard, e.g., a short, load, etc.

In some embodiments, the test sample 76 is placed onto a surface of a conducting material substrate 78, such as a metal, e.g., aluminum. Typically, the conducting material substrate 78 is sized similarly to the test sample 76. In some embodiments, the conducting material is an aluminum puck short.

Without being limited by theory, the test sample 76-conducting material substrate 78 combination is believed to act as a Fabry-Perot etalon, which allows for the estimation of starting values for permittivity extraction. For example, for those frequencies wherein an integral number of half wavelengths equals the sample thickness, the sample is transparent and the reflection from the conducting material e.g., metal, is observed, reduced by any absorption in the test sample 76. This can be used to estimate the imaginary part of the permittivity as described in the Examples. The frequency difference between any two successive points where the material is transparent can be used to estimate the real part of the permittivity. Test sample thickness can also be estimated by using a measurement system, such as the instant measurement system, as a microwave interferometer.

The test sample 76 and/or test sample 76 and conducting material substrate 78 is/are positioned in a measurement region 44 of a measurement system. The measurement region may be located in the near or far-field as described herein; typically the measurement region is in the far-field of the transceiver antenna.

In some embodiments, the present method of measuring a reflection coefficient of a test sample 76 or a test sample 76-conducting material substrate 78 combination includes arranging a RAM 36 between the transceiver antenna 32 and measurement region 44. As noted herein, the RAM 36 typically includes an aperture 38 positioned substantially orthogonal to and substantially aligned with the transceiving axis 34 of the transceiver antenna 32. In some embodiments, the use of an aperture 38 in the RAM 36 to illuminate the test sample 76 allows for a reduction in beam size, thus permitting the reflection coefficient measurements of smaller samples. In other embodiments, the RAM aperture 38 reduces the variation in the radio frequency (RF) radiation that illuminates a test sample by e.g., absorbing the antenna side lobes and any reflections from the surrounding environment in comparison to the RF radiation variation and reflections in the absence of the RAM aperture 38.

The RAM aperture 38 of the present method for measuring a reflection coefficient may be any shape or size as described herein. The RAM 36 and aperture 38 may allow for less than 5% diffraction of the incident field. Further, in some embodiments, the aperture 38 the RAM 36 reduces the beam size, thus reducing test sample 76 lateral movement sensitivity and allowing for the use of smaller test samples. The aperture 38 may also reduce the amount of radiated power on a test sample 76. Nevertheless, in some embodiments, such as those methods that include a vector network analyzer 62, the dynamic range of the VNA 62 can compensate for any reduction in radiated power.

Typically, the transceiver antenna 32 is connected to a source of electromagnetic radiation 54 as described herein. As also described herein, the electromagnetic radiation source 54 may be included as part of a VNA 62. In some embodiments, the electromagnetic source 54 is connected in a measurement system with a millimeter wave VNA extender 70, a frequency multiplier 72, and, optionally, an amplifier 74.

The present method also comprises illuminating the test sample 76 with electromagnetic radiation over a predetermined frequency range. As used herein, a "predetermined frequency range" includes any frequency range including, e.g., frequencies of radio waves, frequencies of microwaves and/or frequencies of millimeter waves. A "predetermined frequency range" as used herein is contemplated to include those frequencies ranging from 1-1000 GHz, such as in any of the E band (60 to 90 GHz), W band (75 to 110 GHz), F band (90 to 140 GHz), D band (110 GHz to 170 GHz), G band (140 to 220 GHz) and Y band (325 to 500 GHz), e.g., any frequency band greater than V band (50 to 75 GHz).

In some embodiments of the present method, the electromagnetic energy is transmitted from the transceiver antenna 32 through the aperture 38 in the RAM 36 to the test sample 76. Reflected electromagnetic radiation from the test sample 76 may then be returned to the transceiver antenna 32 via the aperture 38 to the receiver 56.

The present method of measuring a reflection coefficient of a test sample 76 also comprises determining the reflection coefficient of the test sample based on the reflected electromagnetic radiation. Typically, the receiver 56 is used to measure the magnitude and phase of the electromagnetic radiation reflected from a test sample 76 at a desired frequency. In some embodiments, the processor 58 of a VNA 62, for example, may output 60 a corrected reflection coefficient using well known error correction models after the measurement system is conventionally calibrated as known in the art and described, for example, in Dunsmore, Joel P. "Calibration and Vector Error Correction." *Handbook of Microwave Component Measurements*, John Wiley & Sons, 2012, pp. 124-210, which is herein incorporated by reference in its entirety.

In some embodiments the measured reflection coefficient is an $S_{11}$ reflection coefficient, which is a raw or uncorrected $S_{11}$ reflection coefficient. In other embodiments, the measured reflection coefficient is an actual $S_{11}$ reflection coefficient after error correction as known in the art or as described herein using the present method of obtaining error correction.

Method of Obtaining Error Correction

The present disclosure is also directed to a method of obtaining error correction for a reflection coefficient measurement system, e.g., a measurement system that includes a VNA. Accordingly, the present method may be used to remove systematic errors from a measurement system. For example, in some embodiments, the measurement system may have three systematic errors, i.e., directivity, reflection tracking and source match. Correction values of these systematic errors may be determined using the present method, which, in turn, may be used to obtain an error correction. The error correction may then be used to remove errors from subsequent test sample measurements.

The present method of obtaining error correction is advantageous in that the reflection coefficients of the calibration standards that are used in the instant method are measured with the test sample, in a stack formation, to insure that the reference plane is at the top surface of the test material. That is, during the process of obtaining error correction, the calibration standards are placed at the top of the test sample. While the position of the reference plane is being established with the calibration standards, the test sample is shielded from the electromagnetic radiation. As described herein, in some embodiments, the calibration/sample stack is reversed, thus placing the reference plane exactly at the top surface of the test sample during test sample measurement.

Without being limited by theory, it is believed that test samples measured at the reference plane yield the reflection coefficient of the test sample directly. If the reference plane is defined elsewhere, the measured reflection coefficient is a measurement of the test sample and the material between it and the measurement reference plane. To obtain only the test sample reflection coefficient, either the reference plane has to be mathematically translated to the test sample prior to measurement, or the data has to be translated to the reference plane, after measurement, by the appropriate phase offset and attenuation. See e.g., Hammler, J., Gallant, A. J., and Balocco, C., "Free-Space Permittivity Measurement at Terahertz Frequencies With a Vector Network Analyzer," IEEE Transactions on Terahertz Science and Technology, 6(6), 817-823 (2016), which is herein incorporated by reference in its entirety. In some embodiments, defining the reference plane at the top surface of the material eliminates this issue, allowing the reflection coefficient of the test sample to be measured directly.

Figure 3:
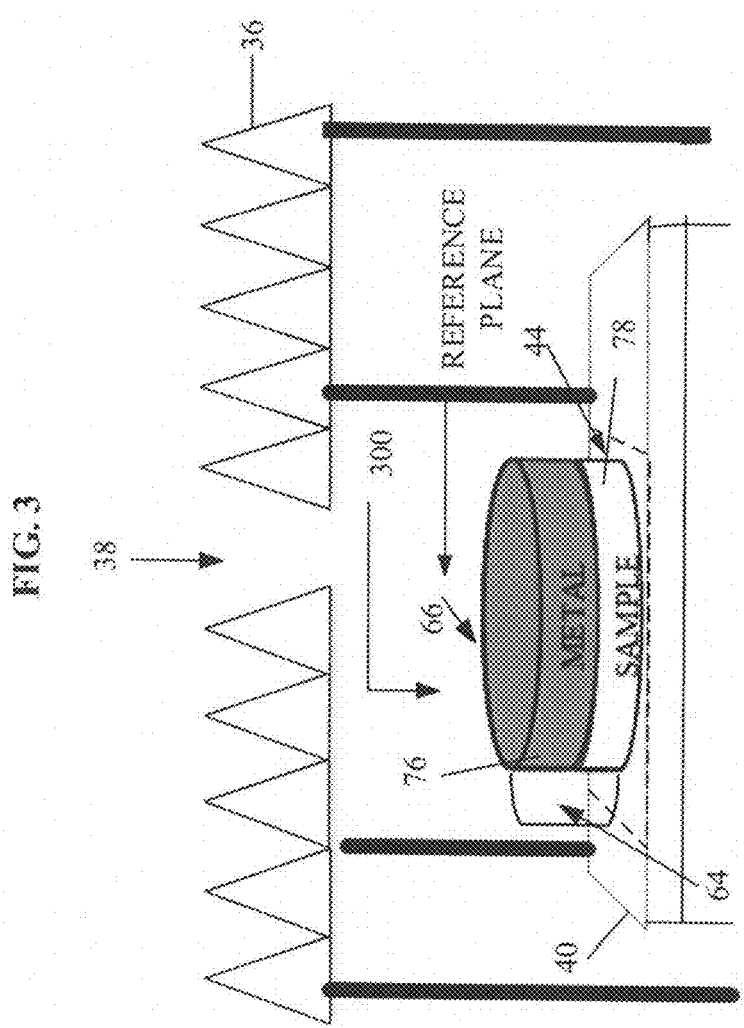
FIG. 3 depicts a test sample and a calibration standard placement during a process for obtaining an error correction as described in the Detailed Description and the Examples.

Referring now to FIG. 3, an embodiment of the present method is now described. The present method for obtaining an error correction includes positioning a stack 300 comprising a first calibration standard 76 and a test sample 78 in a measurement region 44 of a reflection coefficient measurement system, such as depicted in the embodiments provided in 100 and 200 (FIGS. 1 and 2). The stack 300 includes a planar calibration surface 66 and a planar test sample surface (not shown) between which a height 64 is defined. The planar calibration surface 66 and the planar test sample surface (not shown) are substantially parallel to each other and are on opposing sides of the stack 300.

The first calibration standard may be any conventional calibration standard with a known conductivity from which a reflection coefficient may be calculated. More typically, however, the accuracy of the error correction obtained from the present method is improved by defining the known reflection coefficient of the first calibration standard for any individual measurement frequency. In this way, the electrical representation of the calibration standard is a look up table of values rather than a, typically, less accurate polynomial fitting function. See, for example, Keysight, "Specifying Calibration Standards and Kits for Keysight Vector Network Analyzers, Keysight Technologies Application Note AN 1287-11 (2014), which is herein incorporated by reference in its entirety.

Examples of suitable calibration standards for use as the first calibration standard include metal calibration standards, such as a metal short, e.g., an aluminum short, open calibration standards and load calibration standards. In some embodiments, the open calibration standard is an offset short calibration standard. In some embodiments, the offset short calibration standard is an aluminum puck with a height of one quarter of the wavelength, at the center frequency of a measurement band, less than the height of the short calibration standard. In some embodiments, the load is a RAM.

The present method further comprises illuminating at least a portion of the planar calibration surface 66 at a reference plane with electromagnetic radiation over a predetermined frequency range, e.g., 1-1000 GHz such as 60-90 GHz as described herein. As indicated in FIG. 3, the reference plane of the stack 300 is substantially perpendicular to and positioned at the height of the stack.

The present error correction method further comprises measuring a calibration reflection coefficient of the first calibration standard 76. In some embodiments, the receiver 56 measures a phase and magnitude of the electromagnetic radiation reflected from the first calibration standard, which is transmitted to the receiver 56 via the transceiving antenna 32. Typically, this directly measured reflection coefficient, e.g., a "raw" $S_{11}$, does not take into account any possible systemic errors in a measurement system. Accordingly, in some embodiments, the directly measured reflection coefficient of a first calibration standard will be different from the known reflection coefficient value of the calibration standard.

The present method further comprises determining a correction value for the first calibration standard from the measured reflection coefficient of the first calibration standard and a known calibration standard reflection coefficient. Methods and equations useful for determining correction values (also known as error coefficients or error terms) from measured and known reflection coefficients of calibration standards are well known in the art and can be found, for example, in Dunsmore, Joel P. "Calibration and Vector Error Correction." *Handbook of Microwave Component Measurements*, John Wiley & Sons, 2012, pp. 124-210, which is herein incorporated by reference in its entirety.

An error correction may be determined from the first calibration standard. In more typical embodiments, however, additional correction values are determined from one or more additional calibration standards stacked with the test sample before error correction is determined. In these embodiments, the raw reflection coefficients of each of the one or more additional calibration standards, each stacked with the test sample, is measured after illumination at the reference plane with electromagnetic radiation. One or more additional correction value(s) may then be determined by comparing these measured reflection coefficients with known reflection coefficient(s) as described above for the first calibration standard.

In some embodiments, the one or more additional calibration standards are different from each other and different from the first calibration standard. Suitable one or more additional calibration standards include those with a known conductivity from which a reflection coefficient may be calculated or those which may be defined from a look up table of values. Suitable calibration standards for use as the one or more additional calibration standards include metal calibration standards, such as a metal short, e.g., an aluminum short, open calibration standards and load calibration standards. In some embodiments, the open calibration standard is an offset short calibration standard. In some embodiments, the offset short calibration standard is an aluminum puck with a height of one quarter of the wavelength, at the center frequency of a measurement band, less than the height of the short calibration standard. In some embodiments, the load is a RAM.

In some embodiments, a first calibration standard and one or more additional calibration standards is used with the present method. In some embodiments, the first calibration standard is a metal short and the one or more additional calibration standards include an offset short and a load. In other embodiments, the first calibration standard is a load and the one or more additional calibration standards includes a metal short and an offset short. In yet other embodiments, the first calibration standard is an offset short and the one or more additional calibration standards includes a metal short and a load. The different types of calibration standards as described herein may be used in any order with the present method.

The present method for obtaining error correction further comprises determining the error correction from the obtained correction value(s). The error correction may be determined according to any desired known method. For example, the error correction may be determined according to a one port three term error correction model. This model is known in the art and described, for example, in U.S. Pat. No. 6,823,276, e.g., at columns 3-6, which is herein incorporated by reference in its entirety. Other suitable models are described in Dunsmore, Joel P. "Calibration and Vector Error Correction." *Handbook of Microwave Component Measurements*, John Wiley & Sons, 2012, pp. 124-210, which is also herein incorporated by reference in its entirety.

Figure 4:
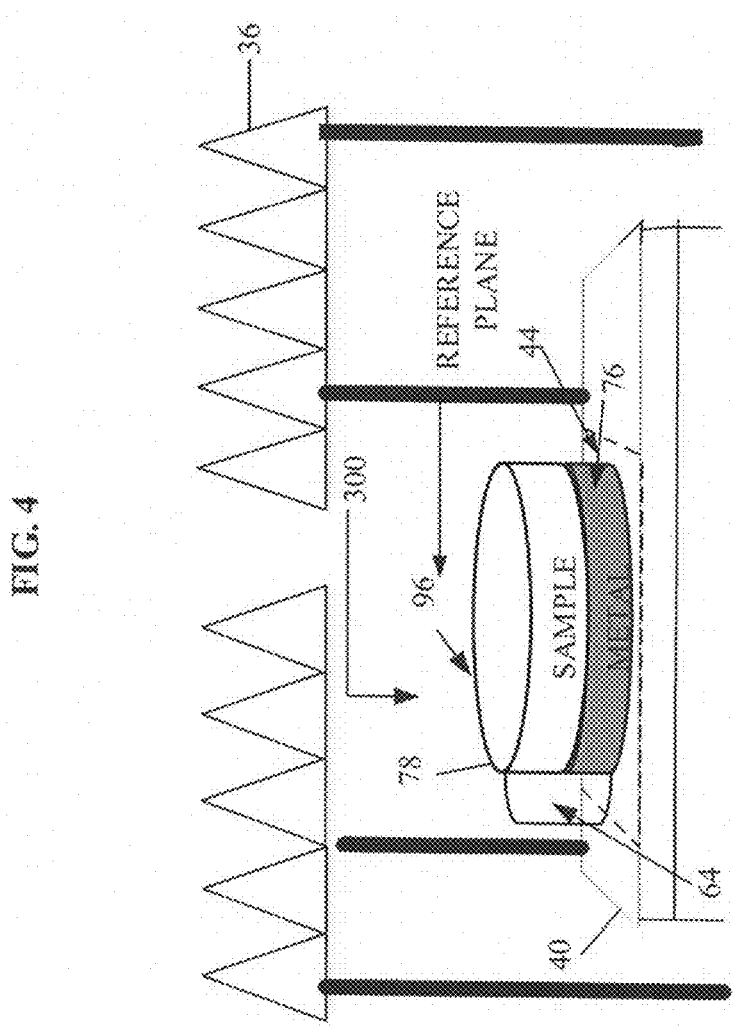
FIG. 4 depicts a test sample and a calibration standard placement during reflection coefficient measurement of the test sample as described in the Detailed Description and the Examples.

Referring to FIG. 4, in some embodiments, the present method for obtaining an error correction further includes obtaining a corrected test sample measurement reflection coefficient. In this embodiment, the present method further comprises inverting the stack 300 of FIG. 3 to obtain the reoriented stack 300 of FIG. 4, resulting in the planar test sample surface 96 being closer to the RAM 36 and the transceiver antenna (not shown) than is the planar calibration surface (not shown). Typically, the calibration standard used with the test sample during measurement of the test sample reflection coefficient is a short, such as a metal short, such as an aluminum puck.

At least a portion of the planar test sample surface 96 of the reoriented stack 300 may be illuminated during test sample reflection coefficient measurement as described herein for the calibration standard reflection coefficient measurement. A corrected test sample measurement reflection coefficient may then be calculated from the previously determined error correction, which is typically stored in the processor 58 of a VNA 62. See, e.g., Dunsmore, Joel P. "Calibration and Vector Error Correction." *Handbook of Microwave Component Measurements*, John Wiley & Sons, 2012, pp. 124-210, which is herein incorporated by reference in its entirety.

The measurement system that may be used with the present method for obtaining an error correction, as well as for obtaining a corrected test sample reflection coefficient measurement, may be any desired measurement system including the measurement system described herein. In some embodiments, the measurement system comprises a RAM 36 positioned between the transceiver antenna 32 and the measurement region 44, wherein the RAM 36 comprises an aperture 38 substantially orthogonal to and substantially aligned with the transceiving axis 34 of the transceiver antenna 32. In some embodiments, the measurement region 44 is located in the far-field of the transceiver antenna 32.

Reference through the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

EXAMPLES

Example 1. Measurement System

A measurement system comprising a Keysight PNA, Model E83654C VNA, OML Inc. Model V12VNA2-T/R Millimeter Wave VNA Extender and frequency multiplier were used to emit RF illumination in the E band (60-90 GHz). This signal was fed to a Custom Microwave Inc. Model RCH 1012R, conical antenna. The radiated beam passes through an aperture in TDK RF Solution, Inc., Model TDK IS-005A, radar absorbing material (RAM) to the material being measured, which is placed on a metal plate, and Thorlabs, Model MLJ 050, vertical translation stage. FIG. 2 is a schematic depicting the measurement system used to characterize samples by measuring the one port S parameter, $S_{11}$, an electric field based, reflection coefficient.

Example 2. RAM Aperture

The RAM aperture used during illumination of a test sample resulted in several advantages. First, it reduced the beam size to a more manageable level, allowing samples to be smaller. Smaller beam size also allowed for precision calibration standards to be used to measure calibration standard reflection coefficients directly at the sample (see below). A further advantage is that building the aperture from RAM significantly reduced the variation in the RF that illuminates the sample by absorbing the antenna side lobes and any reflections from the surrounding environment.

At E band frequencies, the square aperture in the measurement system was five wavelengths or greater on a side. Estimates of Fraunhofer diffraction from the aperture indicated that less than 5% of the incident field was diffracted. The aperture also significantly reduced the radiated power on the test sample, but there was sufficient dynamic range in the VNA to compensate for this. After calibration, the dynamic range was ≥48 dB, which was limited by the RAM used as a calibration standard.

The radiation pattern after the aperture, while slightly complicated by diffraction, need not be known since it was included in the VNA calibration, which was done directly at the sample location (see below). As long as the aperture is not disturbed, the instrument error correction and measurements are relevant.

Figure 5:
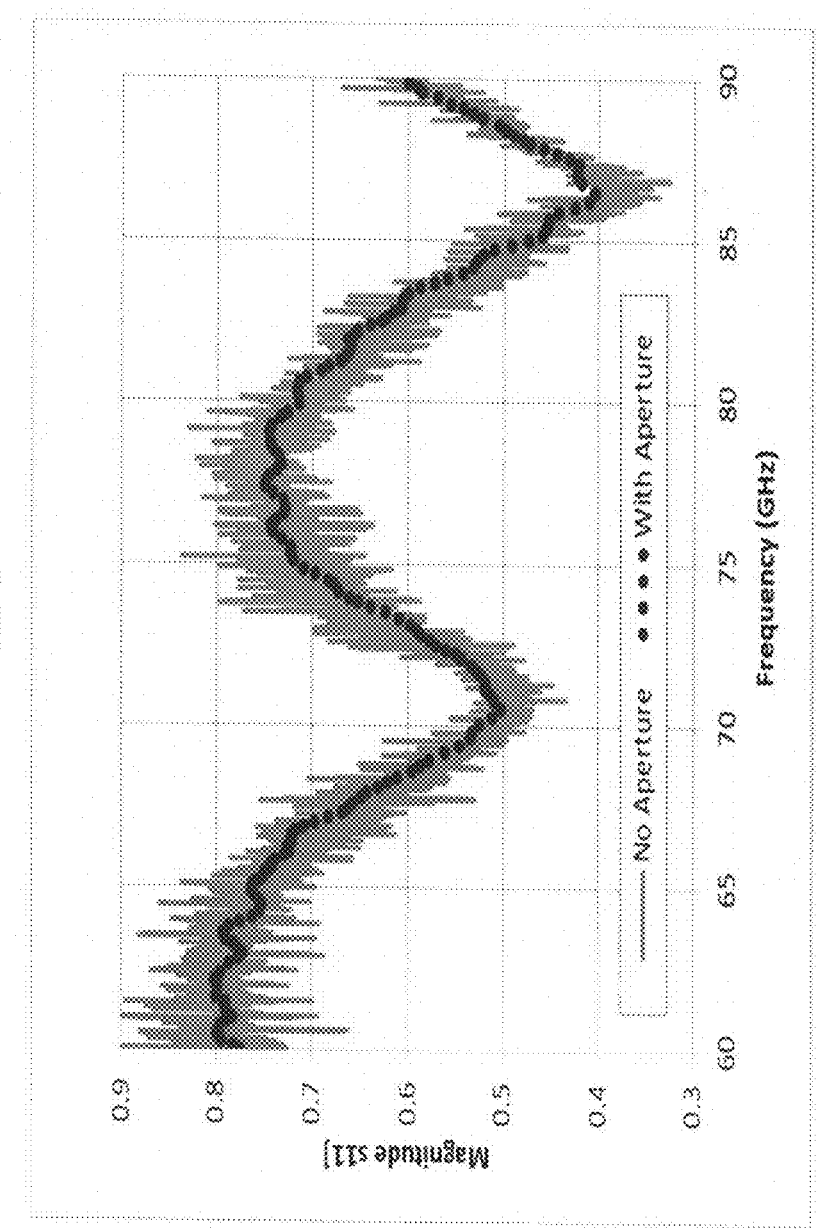
FIG. 5 depicts a graph showing the magnitude of the complex reflection coefficient $S_{11}$ over frequencies in the E band for an inert simulant measured with and without a RAM aperture as described in the Examples. Solid line is data without the aperture. Dashed line is with the aperture.

Measurement of the reflection coefficient of an inert simulant, five mm thick, with and without the aperture are shown in FIG. 5. For these measurements, a twelve inch square sample, on a similar sized aluminum plate, was measured using a separate VNA calibration for each measurement. Notice the structure observable, near the peaks, in the data measured with the aperture that is lost in the noise of the data without the aperture.

Example 3. Obtaining VNA Error Correction

The measurement system described in Example 1 was used to obtain an error correction. The method for determining error correction was an extension of the built-in "one port, "short", "open" "load" procedure resident in the VNA and similar to other methods for obtaining a correction error that use multiple shorts for calibration standards. See e.g., Smith, F., Chambers, B., and Bennett, J., "Calibration techniques for free space reflection coefficient measurements," IEE Proceedings A-Science, Measurement and Technology, 139(5), 247-253 (1992), which is herein incorporated by reference in its entirety. A machined aluminum puck of precise thickness was used for the short. This short calibration standard defines the reference plane location. An offset short standard, made from a similar puck, but with a reduced thickness of one quarter wavelength of the center frequency of the measurement band (1 millimeter for 75 GHz in E band) provided the function of an open standard. A section of RAM provided the load standard.

The known reflection coefficient of each standard for each of the individual measurement frequencies was determined from a look up table of values. The known reflection coefficients were Data Based Calibration Standards. See, for example, Keysight, "Specifying Calibration Standards and Kits for Keysight Vector Network Analyzers, Keysight Technologies Application Note AN 1287-11 (2014), which is herein incorporated by reference in its entirety. Data based calibration standards allowed us to define the quarter wavelength frequency of an offset short, and include the subsequent phase shifts for the other frequencies in the band.

For obtaining error correction, we used the test sample to be measured stacked with the calibration standards to insure that the reference plane was at the top surface of the material during measurement. During this procedure, the short and offset short were placed, respectively, on top of the test sample material, as shown in FIG. 3. The sample was shielded from the RF by the metal during calibration, while the position of the reference plane was established. After obtaining the error correction the sample/metal stack was referenced placing the reference plane exactly at the material top surface, as shown in FIG. 4.

Example 4. Data Analysis and Results

Figure 6:
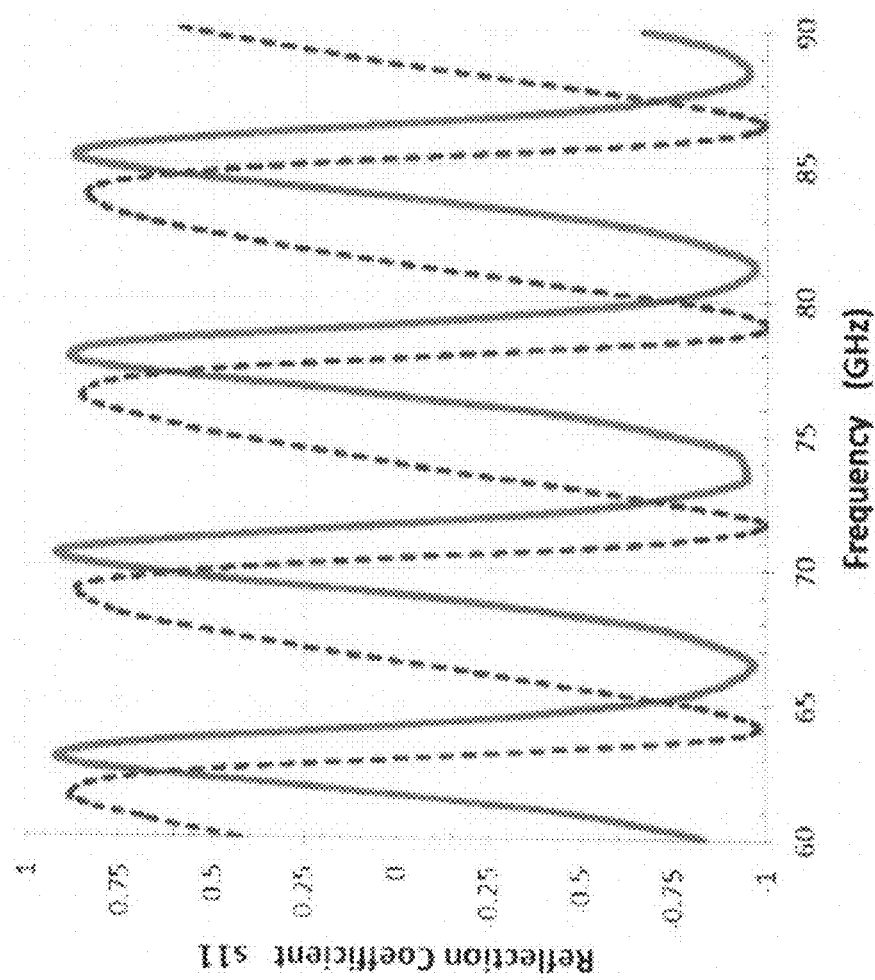
FIG. 6 depicts a graph showing the complex reflection coefficient $S_{11}$ over frequencies in the E band for Rexolite, 1.27 centimeter (cm) thick as described in the Examples. Real part solid line, imaginary part, dashed line.
Figure 7:
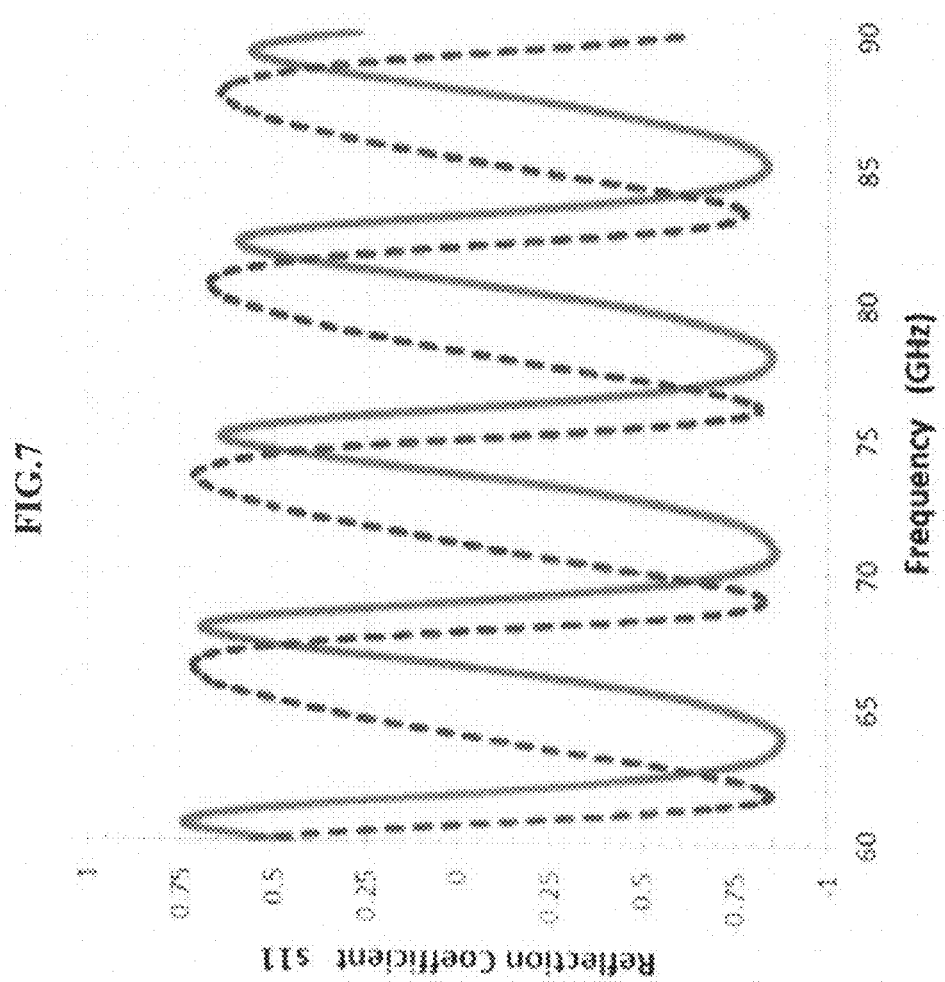
FIG. 7 depicts a graph showing the complex reflection coefficient $S_{11}$ over frequencies in the E band for Lexan, 1.27 cm thick as described in the Examples. Real part solid line, imaginary part, dashed line.

Complex $S_{11}$ data for single measurements of Rexolite, Lexan, and P1000 explosive, with the aperture, and using the modified error correction procedure, are shown in FIGS. 6 through 8. At these frequencies, the losses in the materials are not large, and the samples are mostly transparent.

The data analysis used previously for the 18-40 GHz frequency band, and repeated here, extracts the complex dielectric constant and sample thickness by fitting the measured reflection coefficient data to the Fresnel equation describing multiple reflections between three regions of different indices of refraction: air, the material under test, and the metal plate:

$$r = r_1 e^{i\Theta_0} + t_0 r_2 t_1 (e^{i\Theta_1} + (-r_1 r_2) e^{i\Theta_2} + (-r_1 r_2)^2 e^{i\Theta_2} + \ldots) \quad (1)$$

where the indices, 0, 1, 2 refer to air, material, metal, respectively, t, and r, are the transmission, and reflection coefficients, respectively, of the specific indexed material interface, and θm represents the phase incremented by the propagation. The phasing constant for m-propagations to-and-from the front and back surface of a material with index of refraction, n1, separated by a thickness ΔL is:

$$\Theta_m = \Theta_o + m\, n_1 (2f/c)(2\Delta L) \quad (2)$$

See Weatherall, J. C., Barber, J., and Smith, B. T., "Identifying Explosives by dielectric properties obtained through wide-band millimeter-wave illumination," Proc. SPIE, 9462, 94620F (2015), which is herein incorporated by reference in its entirety.

Ten measurements of each material were analyzed separately, and the average, and standard deviation computed afterwards. Extracted complex dielectric constant and sample thickness for the measured data at 60-90 GHz, along with the data from earlier work at 18-40 GHz are shown in Table 1. Numbers in parenthesis are the standard deviation of the last significant digit.

Rexolite, as a well characterized material, was measured to verify the performance of our system. The value shown in Table 1, below, is in good agreement with values, 2.556+ 0.0007i and 2.558 at 94, and 71 GHz, respectively, cited in the literature. See, e.g., Lamb, J. W., "Miscellaneous data on materials for millimetre and submillimetre optics," *International Journal of Infrared and Millimeter Waves,* 17(12), 1997-2034 (1996), which is herein incorporated by reference in its entirety. Overall we do not expect large changes in the permittivity between the two measured frequency bands. There is good agreement between the Lexan results for which the thickness is very well controlled, and the same sample was used for both measurements. The P1000 explosive result is higher than expected; the material thickness was as manufactured and subject to variations that were not addressed in this work.

TABLE 1

Extracted Values of Complex Permittivity and Sample Thickness for Materials.

| Material | ε' (real) | | ε"(imaginary) | | Thickness (cm) | |
|---|---|---|---|---|---|---|
| Frequency Range (GHz) | 60-90 | 18-40 | 60-90 | 18-40 | 60-90 | 18-40 |
| Rexolite | 2.564 (11) | — | 0.0056 (1) | — | 1.266 (3) | — |
| Lexan | 2.80 (6) | 2.81 (2) | 0.023 (1) | 0.020 (6) | 1.26 (1) | 1.26 (4) |
| P1000 | 2.99 (7) | 2.86 (2) | 0.086 (7) | 0.105 (7) | 0.56 (0) | 1.29 (2) |

We claim:

1. A measurement system for measuring a reflection coefficient of a test sample, comprising:
   a transceiver antenna configured to be coupled to a source of electromagnetic radiation; and
   a Radar Absorbing Material (RAM) positioned between the transceiver antenna and a measurement region of the transceiver antenna, the RAM comprising an aperture substantially orthogonal to and substantially aligned with a transceiving axis of the transceiver antenna, the aperture being substantially smaller in dimension than the measurement region;
   the transceiver antenna being further configured to collect reflected electromagnetic radiation returning to the transceiver antenna via the aperture for determining the reflection coefficient of a test sample based on the reflected electromagnetic radiation; and
   the source of electromagnetic radiation comprising a vector network analyzer (VNA), a millimeter wave VNA extender and a frequency multiplier, said VNA, millimeter wave VNA extender and frequency multiplier being connected in the measurement system.

2. The measurement system of claim 1, further comprising the measurement region being in a far-field of the transceiver antenna.

3. The measurement system of claim 1, further comprising:
   the aperture being a square aperture; and
   each side of the square aperture having a length ranging from five to 10 wavelengths.

4. The measurement system of claim 1, further comprising the transceiver antenna being a conical horn.

5. A method of measuring a reflection coefficient of a test sample, which method comprises:
   positioning a test sample and a conducting material in a measurement region,
      the test sample being positioned on a surface of the conducting material, and
      a transceiver antenna being connected to a source of electromagnetic radiation, the source of electromagnetic radiation comprising a vector network analyzer (VNA), a millimeter wave VNA extender and a frequency multiplier, said VNA, millimeter wave VNA extender and frequency multiplier being connected in a measurement system;
   arranging a Radar Absorbing Material (RAM) between the transceiver antenna and the measurement region,
      the RAM comprising an aperture positioned substantially orthogonal to and substantially aligned with a transceiving axis of the transceiver antenna, the aperture being substantially smaller in dimension than the measurement region;
   illuminating the test sample with electromagnetic radiation over a predetermined frequency range,
      electromagnetic energy being transmitted from the transceiver antenna through the aperture in the RAM, and
      reflected electromagnetic radiation from the test sample returning to the transceiver antenna via the aperture; and
   determining the reflection coefficient of the test sample based on the reflected electromagnetic radiation.

6. The method of claim 5, the determining the reflection coefficient of the test sample comprising determining a complex reflection coefficient measurement.

7. The method of claim 5, further comprising the predetermined frequency range being 1-1000 GHz.

8. The method of claim 5, further comprising the measurement region being located in a far-field of a transceiver antenna.

9. The method of claim 5, further comprising the conducting material being a metal short.

10. The method of claim 5, the method further comprising determining at least one selected from among complex permittivity of the test sample and a thickness of the test sample based on measurement of the reflection coefficient.

* * * * *